May 17, 1938.   B. C. PLACE   2,117,571
MOLDING FASTENER
Filed Feb. 8, 1934
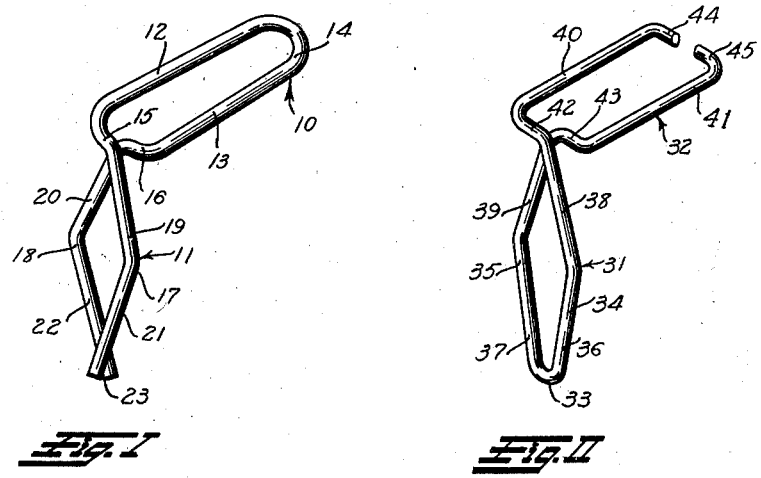
Fig. I
Fig. II
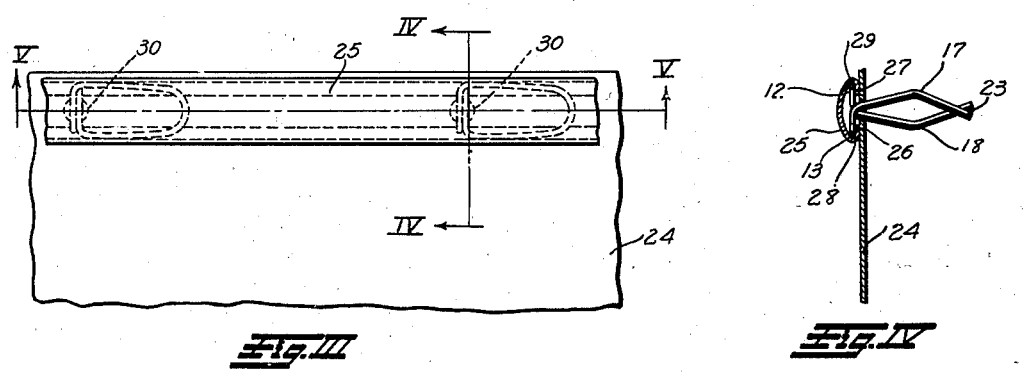
Fig. III
Fig. IV
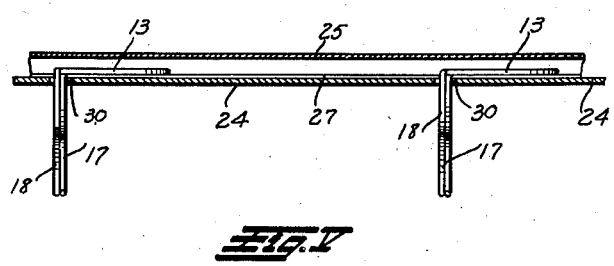
Fig. V
Inventor
Bion C. Place
By Strauch & Hoffman
Attorneys Patented May 17, 1938

2,117,571

UNITED STATES PATENT OFFICE 2,117,571

MOLDING FASTENER

Bion C. Place, Detroit, Mich., assignor of one-half to George E. Gagnier, Detroit, Mich.

Application February 8, 1934, Serial No. 710,389

2 Claims. (Cl. 24—215)

This invention relates to a spring fastener for securing molding or the like upon metallic supporting structures and to an improved combination of molding, fastener and metallic supporting structure.

More particularly, the invention relates to a spring fastener intended especially for securing hollow moldings to parts of automobiles or the like in such manner as to maintain the molding firmly, though resiliently, upon the supporting structure, and in such manner that a yielding pressure is exerted against opposite walls of the molding to maintain it immovably upon the supporting structure.

One of the principal objects of the invention is to provide a spring fastener, consisting of expansible and contractible shank and a head that is associated with the elements of the shank in such a way that when the latter elements are sprung in openings or sockets in the supporting structure and contracted, the head of the fastener is expanded into contact with opposite walls of a hollow molding to insure a firm engagement between the head of the fastener and the molding.

A further object of the invention is to provide an improved spring or snap fastener constructed of a single piece of spring material bent so that one portion of the piece of material forms the shank of the fastener and so that the remainder of the piece of the material forms an elongated head of the fastener disposed at one side of the shank.

Still another object of the invention is to provide a spring fastener consisting of a head and a shank formed so that the contraction of the shank of the fastener results in an expansion of the head thereof.

Another object of the invention is to provide a spring fastener, for securing hollow moldings upon a supporting structure, that is capable of successful and satisfactory use with moldings that vary in width to the extent common in actual practice without introducing looseness between the fastener and molding.

This invention also aims to provide an improved combination of molding, fastener, and supporting structure, in which the fastener is effective to draw the molding firmly into contact with the supporting structure and at the same time formed so that, when the fastener is inserted it is effective to take up any play between the head of the fastener and the molding to the end that the latter is incapable of lateral shifting movement upon the supporting structure after it is secured thereupon by the fastener.

Still further objects of the invention will appear as a description thereof proceeds with reference to the accompanying drawing in which:

Figure I is a perspective view of one form of the improved fastener of the present invention in which the head of the fastener is formed from the mid portion of a strip of material, while the shank is formed from the ends thereof.

Figure II is a perspective view of a modified fastener that is constructed from a piece of material bent so that the mid portions form the shank of the fastener while the ends form the head thereof.

Figure III is a fragmental elevational view of a molding applied to a supporting structure by means of fasteners, such as shown in Figure I.

Figure IV is a sectional view taken on the plane indicated by the line IV—IV in Figure III, looking in the direction of the arrows.

Figure V is a sectional view taken on the plane indicated by the line V—V in Figure III, looking in the direction of the arrows.

Like reference characters indicate like parts throughout the several views.

The fastener of Figure I of the drawing is, as illustrated, constructed preferably from a piece of relatively stiff wire, which is provided with the desired temper after the wire has been formed into the form depicted in said figure. The fastener of said figure comprises a head designated as a whole by the numeral 10 and a shank designated as a whole by the numeral 11. The head 10 is formed from the mid portion of the piece of wire by bending that part of the wire into a U-shaped form, providing relatively straight portions 12 and 13 connected by a curved connecting portion 14. The portions 12 and 13 diverge slightly from the portion 14 and preferably are of substantial length for a purpose hereinbefore pointed out. The portions of the wire at the ends of the portions 12 and 13 are turned toward each other and preferably downwardly inclined somewhat from the plane of the head 10 as indicated at 15 and 16. The portion 12 is slightly longer than the portion 13 so that the portion 15 of the piece of wire is disposed in front of the portion 16, so that the legs 17 and 18 of the fastener, which are carried respectively by the portions 15 and 16, are free to move independently of each other. The legs 17 and 18 are, as illustrated in Figure I, bowed outwardly between the head 10 and the tip of the shank 11 of the fastener, providing divergently disposed holding surfaces 19 and 20 adjacent the head, and convergently disposed guiding surfaces 21 and 22 remote from the head. The ends of the legs 17 and 18 remote from the head are preferably disposed in lapped relation providing an entering point 23 for the shank of the fastener.

The fastener just described is intended particularly for securing hollow metallic moldings to supporting structures preferably of metal, though the same may be used with non-metallic or wooden structures, and in the accomplishment of this object is applied as illustrated in Figures III, IV and V, in which 24 designates a metallic plate-like supporting structure upon which it is desired to secure a hollow molding 25, which preferably is constructed from a strip of sheet metal by turning inwardly the edges 26 and 27 thereof into approximate parallelism but in spaced relation to the body of the molding. Moldings of this character are well known in the art and are in wide use. The inwardly bent edges 26 and 27 provide a pair of channels or grooves 28 and 29 facing towards each other. The molding covers perforations 30 in the supporting structure 24.

In securing the molding to the supporting structure by the improved fasteners of the present invention, the fasteners are first assembled with respect to the molding by sliding the heads 10 into the molding from an end thereof, the heads of the fastener being constructed so that the overall width thereof approximates the space between the bottoms of the grooves or channels 28 and 29 in the hollow moldings. In view of the fact that the portions 12 and 13 diverge from the portion 14 which is first entered in the molding from an end thereof, a wedge-like entering part is provided. Accordingly, the head of the fastener may be readily entered in moldings though the widths thereof vary somewhat as is usual in actual practice due to the impracticability of manufacturing sheet metal moldings, intended to be of the same width, of precisely the same size. If the molding width between the bottoms of channels 28 and 29 is less than the overall width of the fastener head the latter is contracted in entering it and the fasteners can be slid into the molding and moved along the length thereof to a position opposite a perforation 30 in the supporting structure. Sufficient fasteners are assembled with respect to the molding so as to provide a fastener for each perforation in the supporting structure, and the molding is then ready for application to said structure.

In applying the moldings to the supporting structure the tips 23 of the shanks 11 of the fasteners are entered in the perforations 30, the width of the tips being less than the diameter of said perforation. The shank of the fastener is accordingly, readily entered in the perforation. Inasmuch as the width of the shank of the fasteners measured across the point of maximum outward bowing substantially exceeds the diameter of the perforation 30, the inclined guiding surfaces 21 and 22 of the shank of the fastener engage the corners of the perforations as pressure is exerted against the molding forcing the fasteners through said perforations. As pressure is applied, the legs 17 and 18 of each fastener are accordingly, forced toward each other resulting in a contraction of the shank of the fastener, which increases until the point of maximum bowing of the fastener passes through the perforations, when, due to the inherent resilience of the wire to which the fastener is constructed, the legs again spring apart as the shank of the fastener passes through said perforation. The pressure is exerted against the molding until the inturned edges 26 and 27 of the molding contact with the supporting structure at which point the divergently disposed holding surfaces 19 and 20 engage the inner corner of the perforation.

The fastener is so formed that the normal width of the shank measured between the points thereof that contact at opposite sides of the perforation when the fastener is in operative position exceed somewhat the diameter of the opening in the supporting structure, so that when the fastener is completely inserted as illustrated in Figures IV and V of the drawing, the legs 17 and 18 of the fastener are forced towards each other from their normal position prior to the application of the fastener to the perforation. Accordingly, the shank of the fastener is under contraction in its applied position. In view of the fact that the legs diverge outwardly and are under tension, it will be obvious that the fasteners, in applied position, exert a continuously present yielding pressure drawing the molding toward the supporting structure.

It will be observed further that when the fasteners are in their holding position, and the legs forced together by contact with the opposite corners of the perforations 30, that such forcing together of the legs results in an expansion of the head of the fastener, because of the fact that the legs 17 and 18 are disposed in crossed relation adjacent the head. As a result of such expansion of the head, the straight portions 12 and 13 are caused to be separated from each other as a direct result of the contraction of the shank of the fastener in entering it in the perforation in the supporting structure and the straight portions 12 and 13 are forced into the opposite channels 28 and 29 of the hollow molding if they are not already in contact with the bottoms of said channels, thus taking up all looseness between the head of the fastener and the molding. Because of the action just described the molding can exceed slightly the normal maximum width of the head of the fastener without introducing looseness in the construction, thus permitting variations in the width of the molding that even exceed the maximum width of the fastener head. The fastener is designed so that the maximum width of its head is slightly greater than the correct spacing of the bottoms of the channels 28 and 29, so that the head is slightly contracted in entering the molding. And in applied condition the contraction of the shank insures expansion of the head into firm contact with the bottoms of the opposite channels.

It will be observed further that the snug engagement of the straight portions 12 and 13 of the fastener with the walls of the grooves or channels 28 and 29, serves to prevent any turning of the fastener in the perforation 30, with the result that the shank of the fastener is always disposed so that the legs thereof are in planes at right angles to the straight portions 12 and 13 of the head of the fastener, and at right angles to the length of the molding.

In the modification of the invention illustrated in Figure II of the drawing, a fastener is shown in which the shank 31 is formed from the mid-portion of the wire while the head, indicated as a whole by the numeral 32, is formed from the ends of the wire. In order to form the fastener the mid-portion of the wire is bent into a U-shaped form providing an entering portion 33 corresponding to the tip 23 of the fastener before described, and legs 34 and 35 that are bowed outwardly, as illustrated in the drawing, to produce converging guiding surfaces 36 and 37, corresponding to the surfaces 21 and 22 of the fastener before described, and divergently disposed holding surfaces 38 and 39 corresponding respectively to the surfaces 19 and 20 of the fastener before described. The legs 34 and 35 are crossed adjacent the head 32 as illustrated and the ends of the wire are bent to provide straight portions 40 and 41 of the head corresponding to the straight portions 12 and 13 of the fastener before described. Such portions preferably diverge slightly from the ends of the wire for the purpose above described with reference to Figure I. The portions 40 and 41 of the head are connected to the legs by portions 42 and 43 corresponding respectively to the portions 15 and 16 of the fastener before described. In order to facilitate the entry of the fastener in the hollow molding from an end thereof, the ends of the piece of wire from which the fastener is formed are preferably curved inwardly toward each other as indicated at 44 and 45. Such inwardly turned portions may be omitted if desired.

The modified fastener just described is used in the same manner as the fastener of Figure I of the drawing. It will be observed that upon contraction of the shank of the fastener by forcing the legs 34 and 35 towards each other, the straight sections 40 and 41 are forced apart, thus resulting, in an expansion of the head 32. It is contemplated that the modified form of fastener be employed with perforations in the supporting structure that are formed so that the legs 38 and 39 are forced toward each other from their normal position, or the position they occupied prior to the insertion of the shank of the fastener in the perforations of the supporting structure, to the end that the straight portions 40 and 41 are thus forced into engagement with opposite walls of the hollow molding as above described so as to insure a snug engagement between the head of the fastener and the molding and to non-rotatably mount the fastener in the molding. This fastener also adapts itself to moldings of varying widths as above described with reference to the fastener of Figure I.

While the fastener has been shown applied to a metal supporting structure it may be used with a thin wooden structure, or even with a thick wooden structure. In the latter event, holes are bored in the wooden structure of a diameter less than the maximum width of the shank of the fastener and the holding effect is obtained by contact of the points of maximum width of the fastener with opposite walls of the bored holes.

The fastener is preferably constructed of wire as above pointed out but may be stamped from sheet metal if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring fastener for securing hollow moldings upon a supporting structure, consisting of a flat head including a pair of relatively long arms presenting substantially straight parallel edge surfaces spaced apart so that said head fits snugly between opposite walls of said molding and a shank depending from one end of said head and including only a pair of outwardly bowed legs that are integrally directly connected to said arms and crossed adjacent the head of the fastener so that said arms are spread apart when said legs are moved toward each other, each of said legs being disposed approximately in a plane at a right angle to the length of the straight portion of one of said arms.

2. A spring fastener for securing hollow moldings upon a supporting structure, consisting of a wire U-shaped head designed to snugly fit between opposite walls of said molding, and a shank comprising only two legs depending from inturned portions at the ends of the arms of the U, said legs being crossed adjacent the head and again adjacent the end of the shank so as to freely pass each other at said end.

BION C. PLACE.